(12) United States Patent
Rokuskie (10) Patent No.: US 12,034,286 B2
(45) Date of Patent: *Jul. 9, 2024

(54) ADJUSTABLE CABLE SUPPORT STRUCTURE

(71) Applicant: Babylon Consolidated LLC, Warminster, PA (US)

(72) Inventor: Paul Rokuskie, Warminster, PA (US)

(73) Assignee: Babylon Consolidated LLC, Warminster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,752

(22) Filed: Dec. 22, 2022

(65) Prior Publication Data
US 2023/0129715 A1 Apr. 27, 2023

Related U.S. Application Data

(63) Continuation of application No. 16/925,832, filed on Jul. 10, 2020, now Pat. No. 11,569,643.

(51) Int. Cl.
*H02G 3/04* (2006.01)
*F16M 11/04* (2006.01)
*E01D 18/00* (2006.01)

(52) U.S. Cl.
CPC ......... *H02G 3/0437* (2013.01); *F16M 11/046* (2013.01); *H02G 3/0456* (2013.01); *E01D 18/00* (2013.01)

(58) Field of Classification Search
CPC .. B60N 2/0702; B60N 2/0705; H02G 3/0437; H02G 3/0456; H02G 3/0443; H02G 3/045; H02G 3/0608; H02G 3/0475; H02G 3/0487; F16M 11/046; E01D 18/00
See application file for complete search history.

(56) References Cited

U.S. PATENT DOCUMENTS

| 3,809,348 | A | | 5/1974 | Di Laura | |
|---|---|---|---|---|---|
| 4,305,677 | A | * | 12/1981 | Kowalski | F16B 7/0413 403/205 |
| 5,033,702 | A | * | 7/1991 | Robbins | F16L 3/26 248/83 |
| 5,067,679 | A | * | 11/1991 | Courtney | F16L 3/26 248/75 |
| 5,271,585 | A | | 12/1993 | Zetena, Jr. | |
| D364,978 | S | | 12/1995 | Smith | |
| 5,752,679 | A | | 5/1998 | Thomason | |

(Continued)

FOREIGN PATENT DOCUMENTS

| CN | 201851780 U | 6/2011 |
|---|---|---|
| CN | 104028924 A | 9/2014 |
| CN | 209071995 U | 7/2019 |

*Primary Examiner* — Christopher Garft
(74) *Attorney, Agent, or Firm* — Barley Snyder (57) ABSTRACT

An adjustable cable support member includes a first track defining first and second channels extending in a longitudinal direction thereof, and a second track at least partially slidably received within the first and second channels of the first track in the longitudinal direction for enabling adjustment of the overall length of the cable support member. The first track and the second track define a cable receiving space extending continuously in the longitudinal direction over the length of the cable support member.

18 Claims, 6 Drawing Sheets

(56) References Cited

U.S. PATENT DOCUMENTS

| | | | | |
|---|---|---|---|---|
| 5,755,421 A | * | 5/1998 | Meier | B60N 2/0705 |
| | | | | 248/429 |
| 6,003,819 A | | 12/1999 | Hall | |
| 6,116,561 A | * | 9/2000 | Christopher | B60N 2/0715 |
| | | | | 297/216.16 |
| 6,644,601 B2 | | 11/2003 | Aussiker | |
| 6,879,490 B2 | * | 4/2005 | Mattei | H05K 7/06 |
| | | | | 361/747 |
| D647,725 S | | 11/2011 | Seidel et al. | |
| 8,967,555 B2 | | 3/2015 | Smith | |
| 10,107,420 B1 | * | 10/2018 | Winn | H02G 3/0437 |
| 10,914,074 B2 | | 2/2021 | Williams | |
| 11,022,235 B2 | * | 6/2021 | Comalander | F16L 3/1091 |
| 2012/0073237 A1 | | 3/2012 | Brown | |
| 2019/0027909 A1 | * | 1/2019 | Mifsud | H02G 3/0406 |
| 2021/0000602 A1 | | 1/2021 | Kumta et al. | |

\* cited by examiner

ADJUSTABLE CABLE SUPPORT STRUCTURE

CROSS-REFERENCE TO RELATED APPLICATION(S)

This application is a continuation of U.S. patent application Ser. No. 16/925,832, filed Jul. 10, 2020, the entire disclosure of which is incorporated by reference herein.

FIELD OF THE INVENTION

The present disclosure relates to support structures, and more particularly, to an adjustable structure for supporting cables and other conduits.

BACKGROUND

Safe working environments, and more generally, personal safety in public or private venues, continues to be of critical concern for private industry and government alike. Many of these environments, such as construction sites, concert or other entertainment venues, or convention centers, often rely on significant electrical and other powered equipment. This equipment typically requires large amounts of associated electrical cables or other conduits (e.g., power and/or signal cables, and/or pneumatic or hydraulic lines) routed to various locations and from various sources arranged remotely from one another. As a result, potential safety hazards may be created in the areas of high foot traffic, such as along walkways and/or proximate doorways and other openings. Routing these lines, for example, along the floor of a site presents several drawbacks, including creating tripping and/or electrocution hazards, as well as subjecting the equipment and associated lines to unnecessary damage and/or wear.

Safe and acceptable cable handing practices generally include elevating or suspending these conduits in areas of exposure, so as not to come into contact with or pose a tripping hazard for, a worker or a patron. Currently suspension solutions include attaching cables to existing structures, such as to walls or other preexisting existing equipment. However, such solutions are often time consuming and/or difficult to install and/or uninstall without creating damage (e.g., anchor holes of other mounting surface damage) which must be addressed.

Accordingly, there is a need for improved methods of quickly and efficiently routing cables and other conduits over or otherwise around select areas.

SUMMARY

According to an embodiment of the present disclosure, an adjustable cable support member is provided. The support member includes a first track defining a first channel extending in a longitudinal direction thereof, and a second track at least partially slidably received within the first channel of the first track in the longitudinal direction for adjusting an overall length of the cable support member. The first track and the second track define a cable receiving space therein extending continuously in the longitudinal direction over the length of the cable support member.

According to another embodiment of the present disclosure, an adjustable cable support assembly is provided. The assembly includes a cable support member defining a cable space over a length thereof and configured to receive at least one cable therein. The member furthers includes a first track defining a first channel extending in a longitudinal direction thereof, and a second track at least partially slidably received within the first channel of the first track in the longitudinal direction for adjusting an overall length of the cable support member. A first vertically adjustable support is connected proximate a first end of the cable support member, and a second vertically adjustable support is connected proximate a second end of the cable support member for supporting the cable support member in an elevated position.

BRIEF DESCRIPTION OF THE DRAWINGS

The invention will now be described by way of example with reference to the accompanying figures, of which.

DETAILED DESCRIPTION OF THE EMBODIMENT(S)

Exemplary embodiments of the invention will be described hereinafter in detail with reference to the attached drawings, wherein like reference numerals refer to like elements. The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

The disclosure relates to an elevated, adjustable cable support structure or "cable bridge" useful for routing cables and other conduits in an elevated position around doorways and other openings to avoid unnecessary obstructions along a path of foot traffic, for example.

Figure 1:
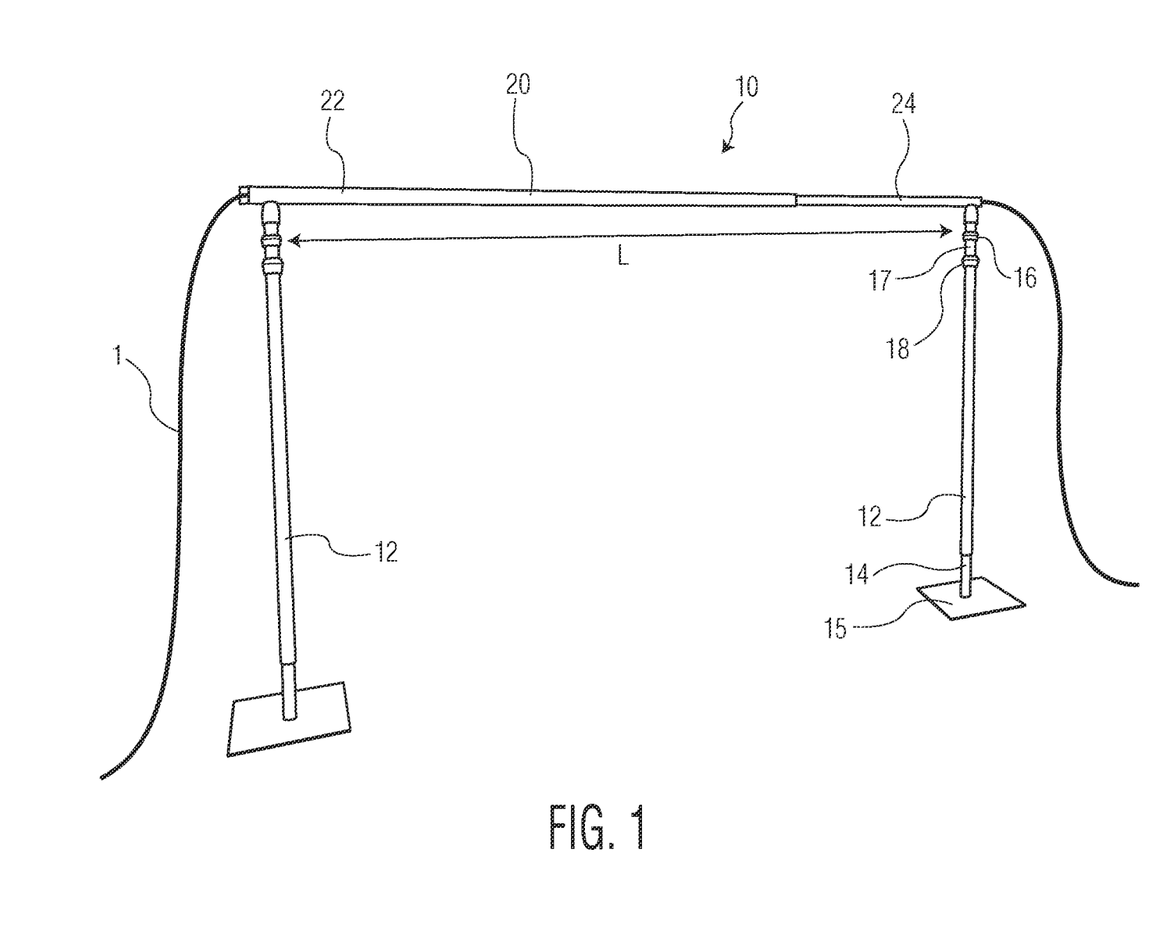
FIG. 1 is front perspective view of an adjustable cable support structure or assembly according to an embodiment of the present disclosure.
Figure 2:
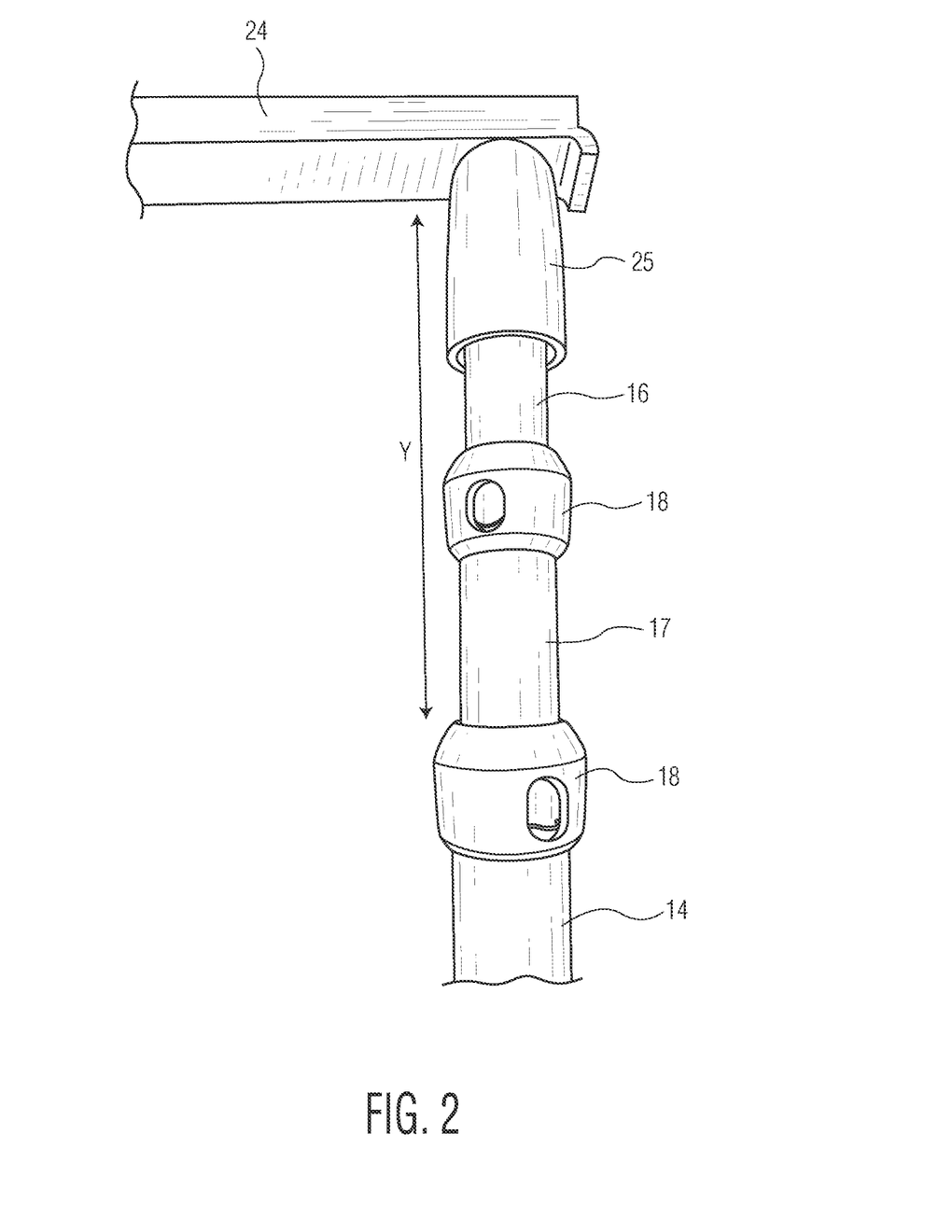
FIG. 2 is a partial perspective view of the cable support structure of FIG. 1.

Referring generally to FIGS. 1 and 2, perspective views of an elevated cable guide or cable support structure 10 for routing one or more cables 1 in an elevated position according to an embodiment of the present disclosure are shown. The cable support structure 10 includes two telescoping or otherwise height-adjustable vertical support elements or members 12, each connecting to and supporting an end of an expandable cable support member 20. Each vertical support member 12 includes a fixed end 14 attached to a horizontally extending base 15 for enabling the support members to be free-standing in the illustrated vertical orientation. Each support member 12 further includes at least one moveable end or segment 16 adjustable or moveable in a vertical direction Y with respect to the fixed end 14. The moveable end 16 is selectively fixable in a plurality of positions with respect to the fixed end 14 for positioning a respective end of the cable support member 20 at a desired height. In the illustrated embodiment, the fixed end 14 and the moveable end 16 define a telescoping arrangement that further includes a moveable intermediate segment 17 arranged between the fixed end 14 and the moveable end 16, providing for further adjustment (i.e., increased range) of the overall length of the vertical support member 12. As shown, the vertical support member 12 further includes one or more locking collars 18 for selectively fixing the vertical position of the moveable end 16, the intermediate segment 17, and/or the fixed end 14 in an infinite number of positions relative to one another via the selective application of friction force between the ends and/or segments. While locking collars are shown, it should be understood that other forms of fixation between the ends and/or segments may be used, such a spring-loaded locking pin(s) or clevis pin(s) and associated apertures, without departing from the scope of the present disclosure.

The cable support member 20 according to an embodiment of the present disclosure includes a first member and a second member moveably attached to one another. More specifically, in the illustrated embodiment, the first member comprises a first track 22 and the second member comprises a second track 24. The first and second tracks 22,24 are engageable with one another and moveable relative to one another in an axial of the cable support member 20 direction (i.e., along an axis of elongation) for adjusting its overall length L. As shown in greater detail in FIG. 2, each of the tracks 22,24 of the cable support member 20 includes provisions for attaching to the moveable end 16 of each vertical support member 12. For example, in one embodiment, the cable support member 20 includes at least two receivers 25, embodied herein as hollow protrusions opening and extending in a downward vertical direction from each of the first and second tracks 22,24. The receivers 25 are sized so as to accommodate a portion of each of the movable ends 16 therein. The cable support member 20 may be placed over the vertical support members 16, and secured thereto by slidably inserting the end portions of the vertical support members 12 within the receivers 25. In this way, a cable support member according to embodiments of the present disclosure may be universal to the extent that it can be mated with and/or supported by a variety of different vertical support structures, such as existing off-the-shelf pole stands, increasing its usability and practicality in the field.

Figure 3:
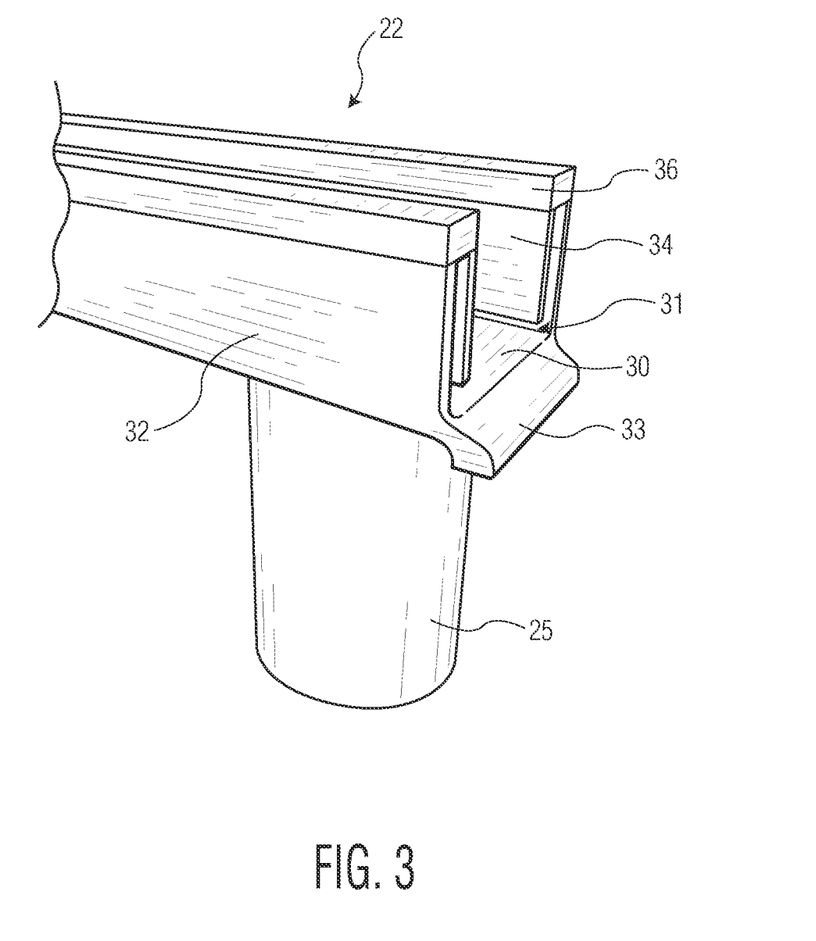
FIG. 3 is a perspective view of a first end of the cable support structure shown in FIG. 1.
Figure 4:
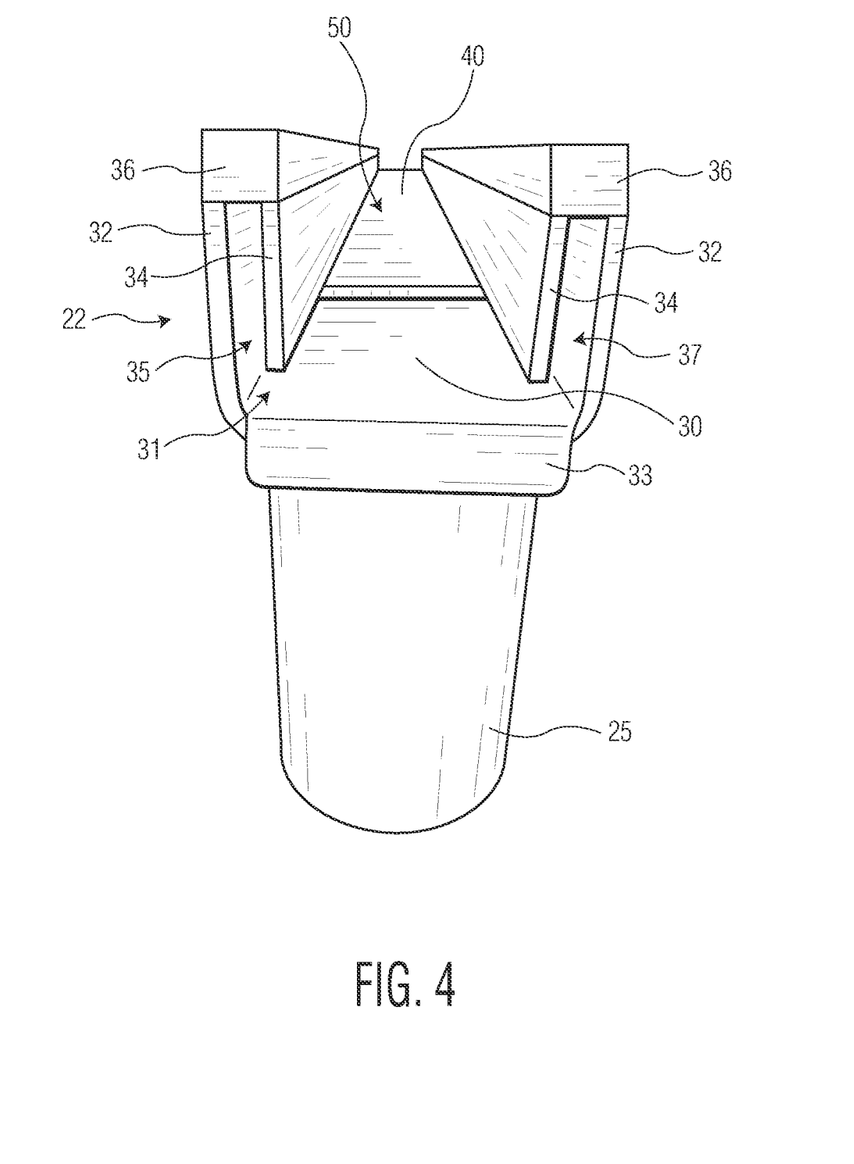
FIG. 4 is a side view of the first end of the cable support structure shown in FIG. 3.

Referring now to FIGS. 3 and 4, the first track 22 comprises a body having a generally U-shaped external cross-section, including a base wall 30 and two outer sidewalls 32 extending generally perpendicularly from the base wall. The outer sidewalls 32 define a wall of respective first and second channels 35,37 defined by the first track 22. The first track 22 further comprises two opposing inner sidewalls 34, each arranged generally parallel with a corresponding one of the outer sidewalls 32. Each outer sidewall 32 may be fixedly attached to a respective inner sidewall 34 via a respective top wall 36 extending between an end of each outer sidewall 32 and an end of each respective inner sidewall 34. The inner sidewalls 34 extend from the top walls 36 in a direction toward the base wall 30. In this way, a respective one of the outer sidewalls 32, the top walls 36 and the inner sidewalls 34 define each of the channels 35,37. Each channel 35,37 comprises a generally continuous hollow space extending in the longitudinal direction of the cable support member 20. Further, each inner sidewall 34 comprises a free end opposite the top wall 36, defining a gap or opening 31 between the inner sidewall 34 and the base wall 30. The openings 31 may be defined continuously along an entire length of the first track 22.

The cable support member 20 defines a cable space 50 arranged between opposing inner sidewalls of the first and second tracks 22,24 and extending continuously in a longitudinal direction thereof. The cable space 50 is sized so as to accommodate one of more cables or other conduits therein, and guide such elements along a length of the cable support member. In an embodiment of the present disclosure, the first track 22 further comprises a rounded free end 33 extending from the base wall 30. The rounded free end 33 may define a convex protruding surface having an axis of curvature oriented generally transverse to the longitudinal direction of the cable support member 20. In one embodiment, an arcuate surface defined by the rounded free end comprises an arc length extending over at least 90 degrees. The rounded free end 33 ensures that cables or other conduits are not damaged entering and/or exiting the cable support member 20 in these high stress and otherwise sharp areas.

Figure 5:
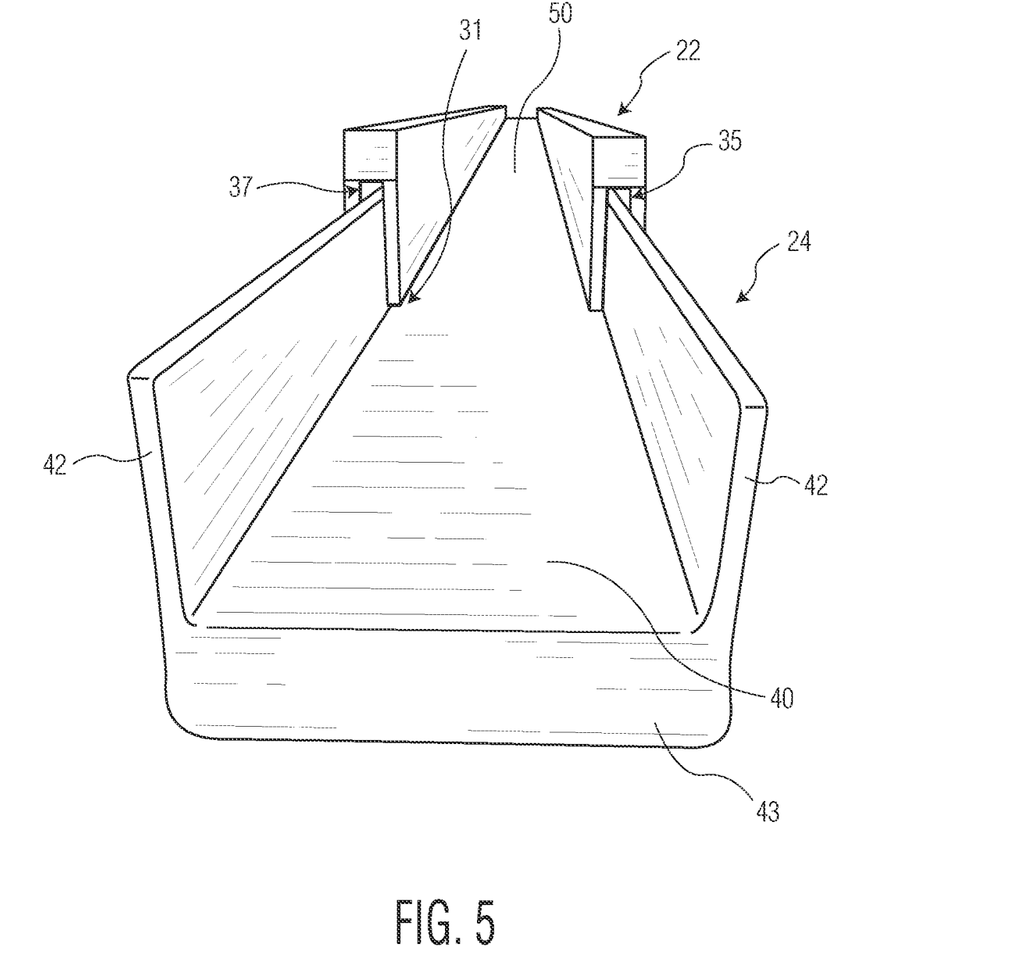
FIG. 5 is a side view of a second end of the cable support structure shown in FIG. 1.
Figure 6:
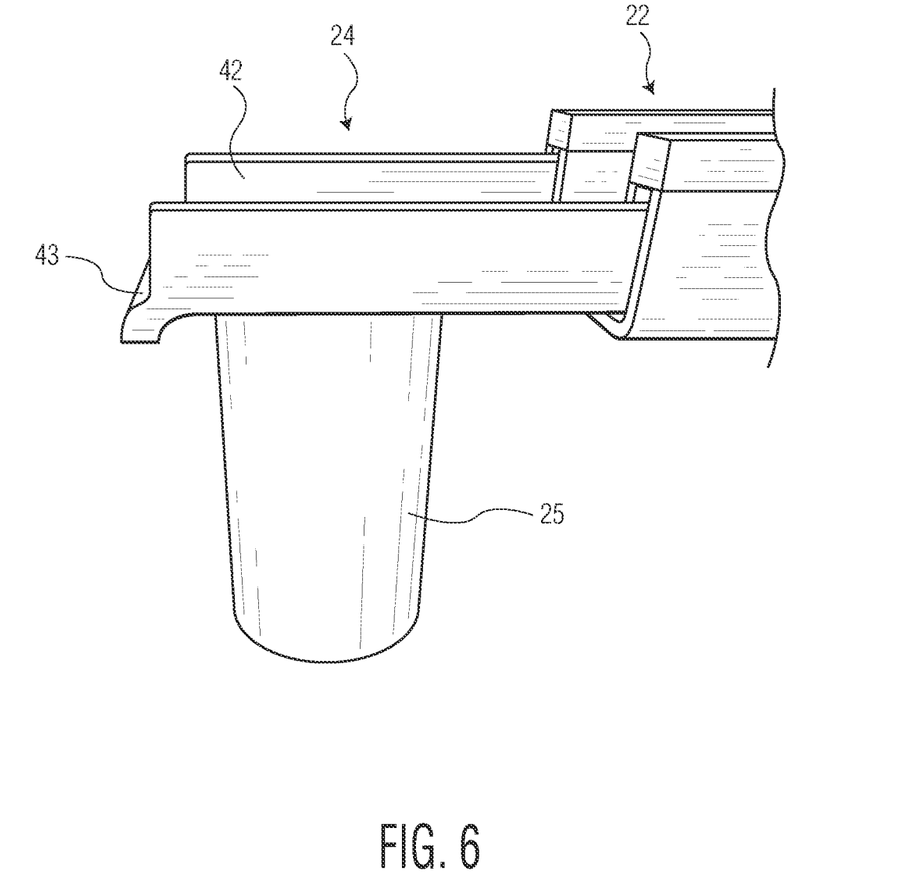
FIG. 6 is a perspective view of the second end of the cable support structure shown in FIG. 5.

Referring now to FIGS. 5 and 6, the second track 24 comprises a body having a generally U-shaped cross-section including a base wall 40 having two opposing sidewalls 42 extending generally perpendicularly therefrom. The cross-section of the second track 24 is generally complementary to that of the first track 22 such that the second track is insertable into and engageable with the first track 22. More specifically, the two opposing sidewalls 42 of the second track 24 are receivable within the channels 35,37 defined by the first track 22, and slidable therein the longitudinal direction of the first track 22. The base wall 40 of the second track 24 is aligned generally parallel with and at least abutting the base wall 30 of the first track 22 (see FIG. 4), wherein the base wall 40 extends in a direction transverse to the longitudinal direction of the tracks and into the channels 35,37 via the openings 31. In this way, the second track 24 and the first track 22 comprise a generally telescoping arrangement, wherein an overall length L of the support member 20 may be adjusted. In an embodiment of the present disclosure, the second track 24 may also define a rounded free end 43 extending from the base wall 40 having features similar to those set forth above with respect to the rounded free end 33 of base wall 30.

Once inserted in an axial direction of the tracks, the first track 22 is captured relative to the second track 24, and motion between the tracks in directions other than the axial direction is prevented. The engaged tracks are slidably expandable and contractible for accommodating various opening spans, and able to support substantial cable loads.

Capturing the sidewalls 42 of the second track 24 within the channels 35,37 in the above-described manner greatly increases the load-carrying capacity of the support member 20 compared to other telescoping arrangements. As shown, bending loads placed on the support member 20 act to urge the second track 24 into contact with both the base wall 30 of the first track 22 and well as the top wall 36. Accordingly, in order to increase the load carrying capacity of the support member 20, the thickness of the top wall 36 in a vertical direction is at least double that of a thickness of either the sidewalls or the base walls of the first and/or the second tracks 22,24. In one embodiment, the top wall 36 comprises a square cross-section, aiding in improving the structural strength of the member 20, as well as facilitation attachment of the first and second sidewalls thereto.

In one exemplary preferred configuration, the base wall 30 and outer sidewalls 32 of the first track 22 may be formed from an extruded piece of material, such as extruded aluminum. The top wall 36 may be formed from a square or rectangular piece of stock material which may be affixed to the outer sidewalls 21 via, for example, welding. Likewise, the opposing inner sidewalls 34 may comprise strips of stock material welded to the top wall 36. The second track 24 may be formed from extruded material, such as an extruded U-shaped aluminum channel. The rounded free ends 33,43 of the first and second tracks 22,24 may comprise portions of rounded stock, such as quarter round stock affixed to an end of respective base walls 30,40 via, for example, welding.

In one embodiment of the present disclosure, the channels 35,37 of the first track may be capped or otherwise closed on a first end thereof, thereby preventing the second track 24 inserted into a second end of the first track 22 from extending past this closed end. In other embodiments, the channels 35,37 remain open and unobstructed along the entire length of the first track 22, thereby allowing the second track 24 to be inserted into the first track 22 from either end thereof. The cable support member 20 may further include one of more locking features configured to fix the second track 24 relative to the first track 22 in the longitudinal direction. In one embodiment, this may be achieved by a fastener threaded through the base wall 30 of the first track, wherein a free end of the fastener bears on an underside of the base wall 40 of the second track 24 for fixing the first track relative to the second track via friction therebetween.

According to embodiments of the present disclosure, each base wall 30,40 of the first and second tracks may further define an aperture formed therethrough and aligned coaxially with an opening defined by a respective one of the receivers 25. In other words, the opening defined by each receiver 25 may extend through a respective one of the base walls 30,40. In this way, one or more cables arranged within the cable space 50 and along substantially the length L of the cable support member 20 may be routed through these apertures, into the receivers, and further into hollow interiors of the vertical support members where it may enter/exit proximate a bottom thereof. In this way, embodiments of the present disclosure provide provisions for concealing and protecting the cables in an enclosed manner not only over the length L of the cable support member 20, but also in each vertical direction as the cable is guide up to and down from the cable support member. A decorative fabric cover (not shown) may also be provided for enhancing the appearance of the cable bridge, enabling its use in more formal settings.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An adjustable cable support member, comprising:
   a first track defining a first channel extending in a longitudinal direction thereof, including:
   a base extending in the longitudinal direction;
   a first outer sidewall extending from a first end of the base;
   a first inner sidewall extending parallel to the first outer sidewall in a vertical direction and the longitudinal direction;
   a first top wall having a square cross-section and connecting the first outer sidewall and the first inner sidewall and having a thickness in the vertical direction that is greater than a thickness of each of the base, the first inner sidewall and the first outer sidewall, the first inner sidewall defining a longitudinally extending free end opposite the first top wall; and
   an opening is defined between the free end of the first inner sidewall and the base, a height of the opening in the vertical direction is less than a height of the first inner sidewall; and
   a second track at least partially slidably received within the first channel of the first track in the longitudinal direction, the first track and the second track defining a cable receiving space extending continuously in the longitudinal direction over the length of the cable support member.

2. The cable support member of claim 1, wherein the base, the first top wall, the first outer sidewall and the first inner sidewall each define a respective uniform planar surface extending uninterrupted in the longitudinal direction.

3. The cable support member of claim 2, wherein the first track further includes a second outer sidewall extending from a second end of the base.

4. The cable support member of claim 3, wherein the first track further comprises a second inner sidewall attached to a first free end of the second outer sidewall and extending parallel to the second outer sidewall in the vertical direction and the longitudinal direction.

5. The cable support member of claim 4, further comprising a second top wall connecting the first end of the second outer sidewall and the second inner sidewall, wherein the first channel is defined by the base, the first outer sidewall and the first inner sidewall, and a second channel is defined by the base, the second outer sidewall and the second inner sidewall.

6. The cable support member of claim 5, wherein the second top wall, the second outer sidewall and the second inner sidewall each define a respective uniform planar surface extending uninterrupted in the longitudinal direction.

7. The cable support member of claim 5, wherein the second inner sidewall comprises a longitudinally extending free end opposite the second top wall, an opening is defined between the free end of the second inner sidewall and the base, and a height of the opening between the free end of the second inner sidewall and the base in the vertical direction is less than a height of the first and second inner sidewalls.

8. The cable support member of claim 7, wherein the second track includes a base, a first sidewall extending perpendicularly from a first end of the base and a second sidewall extending perpendicularly from a second end of the base.

9. The cable support member of claim 8, wherein, with the second track is received within the first track in the longitudinal direction, the base of the second track extends parallel to the base of the first track and through the openings defined between the free ends of each of the first and second inner sidewalls, the first sidewall of the second track arranged within the first channel and the second sidewall of the second track is arranged within the second channel, and the longitudinally extending free ends of the first inner sidewall and the second inner sidewall opposing a top surface of the base of the second track at least partially along their lengths.

10. A cable support assembly, comprising:
a first track defining a first channel extending in a longitudinal direction thereof, including:
a base extending in the longitudinal direction;
a first outer sidewall extending from a first end of the base;
a first inner sidewall attached to a first end of the first outer sidewall and extending parallel to the first outer sidewall in a vertical direction and the longitudinal direction; and
a first top wall connecting the first outer sidewall and the first inner sidewall, the first top wall having a thickness in the vertical direction that is greater than a thickness of each of the base, the first inner sidewall and the first outer sidewall, wherein:
the base and the first outer sidewall of the first track comprise a monolithic extruded element;
the first top wall comprises a rectangular element having a bottom side welded to an end of the first outer sidewall; and
the first inner sidewall comprises a strip of material welded to the bottom side of the top wall;
a second track at least partially slidably received within the first channel of the first track in the longitudinal direction and including a base and a first sidewall extending perpendicularly from a first end of the base, the first track and the second track defining a cable receiving space extending continuously in the longitudinal direction over the length of the cable support member, the base of the first track including a rounded free end extending away from a remainder of the base of the first track in the longitudinal direction and a downward direction away from the cable receiving space, and the base of the second track including a rounded free end on an end opposite the rounded free end of the first track and extending from a remainder of the base of the second track in the longitudinal direction and a downward direction away from the cable receiving space;
a first receiver directly fixedly connected to an underside of the base of the first track proximate an end of the first track, the first receiver defining a hollow protrusion extending and opening in a vertically downward direction from the base of the first track;
a second receiver directly fixedly connected to an underside of the base of the second track proximate an end of the second track, the second receiver defining a hollow protrusion extending and opening in a vertically downward direction from the base of the second track, each of the first and second receivers configured to engage with a respective vertical support member for supporting the cable support member in an elevated position;
first and second vertical support members each having a movable free end received within a respective one of the first and second receivers, each of the vertical support members being adjustable in length independent of the first and second receivers; and
a cable arranged within the cable receiving space and extending over the rounded free end of each of the first track and the second track.

11. The cable support assembly of claim 10, wherein the base, the first outer sidewall and the first inner sidewall of the first track each define a respective uniform planar surface extending uninterrupted in the longitudinal direction.

12. The cable support assembly of claim 10, wherein an opening is defined in the vertical direction between a free end of the first inner sidewall and the base, the opening having a height in the vertical direction that is less than a height of the first inner sidewall.

13. The cable support assembly of claim 12, wherein, when the second track is received within the first track in the longitudinal direction, the base of the second track extends parallel to the base of the first track and through the opening defined between the free end of the first inner sidewall.

14. The cable support assembly of claim 10, wherein the first outer sidewall of the first track, the first inner sidewall of the first track and the first sidewall of the second track define parallel and continuously planar walls extending in the vertical and longitudinal directions.

15. The cable support assembly of claim 14, wherein, with the cable support member supported by the first and second vertical support members, a longitudinally extending free end of the first inner sidewall opposes a top surface of the base of the second track.

16. The cable support assembly of claim 10, wherein the second track contacts the base of the first track and the top wall in response to bending forces acting on at least one of the first track or the second track.

17. The cable support member of claim 1, wherein the second track is adapted to contact the base of the first track and the top wall in response to bending forces acting on at least one of the first track or the second track.

18. An adjustable cable support member, comprising:
a first track defining a first channel extending in a longitudinal direction thereof, including:
a base extending in the longitudinal direction;
a first outer sidewall extending from a first end of the base, the base and the first outer sidewall comprising a monolithic extruded element;
a first inner sidewall extending parallel to the first outer sidewall in a vertical direction and the longitudinal direction;
a first top wall connecting the first outer sidewall and the first inner sidewall and having a thickness in the vertical direction that is greater than a thickness of each of the base, the top wall comprising a rectangular element having a bottom side welded to an end of the first outer sidewall, the first inner sidewall and the first outer sidewall, the first inner sidewall defining a longitudinally extending free end opposite the first top wall, the first inner sidewall comprising a strip of material welded to the bottom side of the top wall; and
an opening is defined between the free end of the first inner sidewall and the base, a height of the opening in the vertical direction is less than a height of the first inner sidewall; and
a second track at least partially slidably received within the first channel of the first track in the longitudinal direction, the first track and the second track defining a cable receiving space extending continuously in the longitudinal direction over the length of the cable support member.

* * * * *